J. H. LOUGHRIDGE.
SAW GUMMER AND SHARPENER.
APPLICATION FILED FEB. 26, 1907.
909,916.
Patented Jan. 19, 1909.
2 SHEETS—SHEET 1.
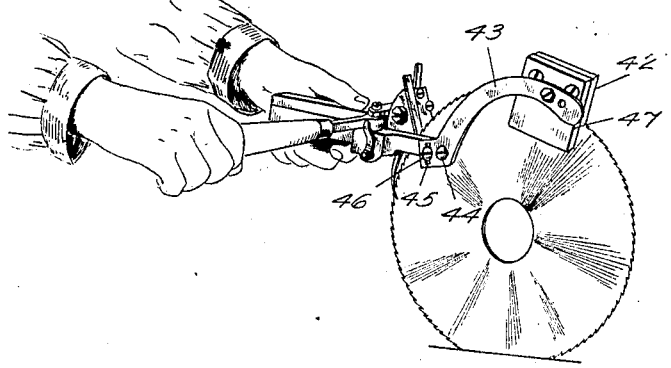
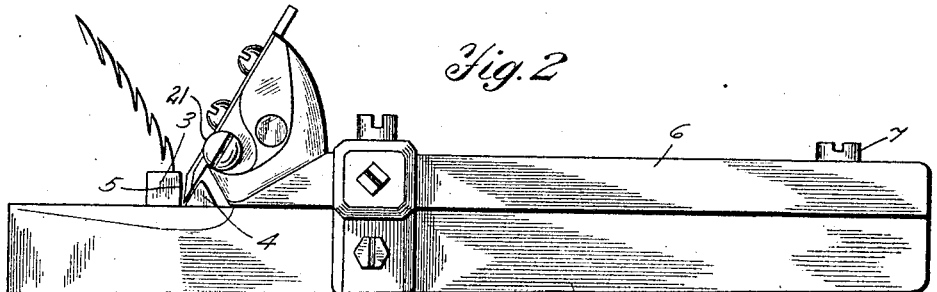
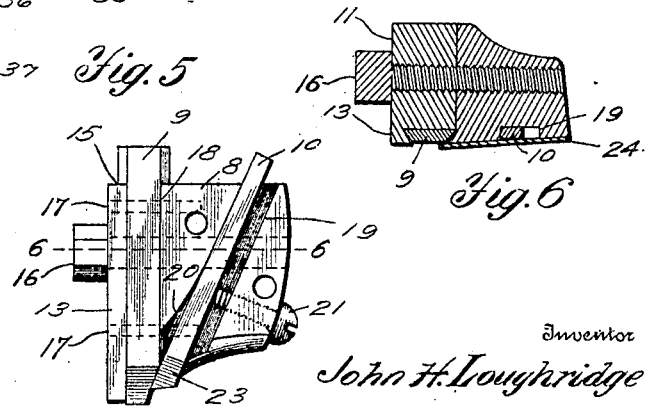
Witnesses
R. C. Claflin
K. Allen
Inventor
John H. Loughridge
By Victor J. Evans
Attorney

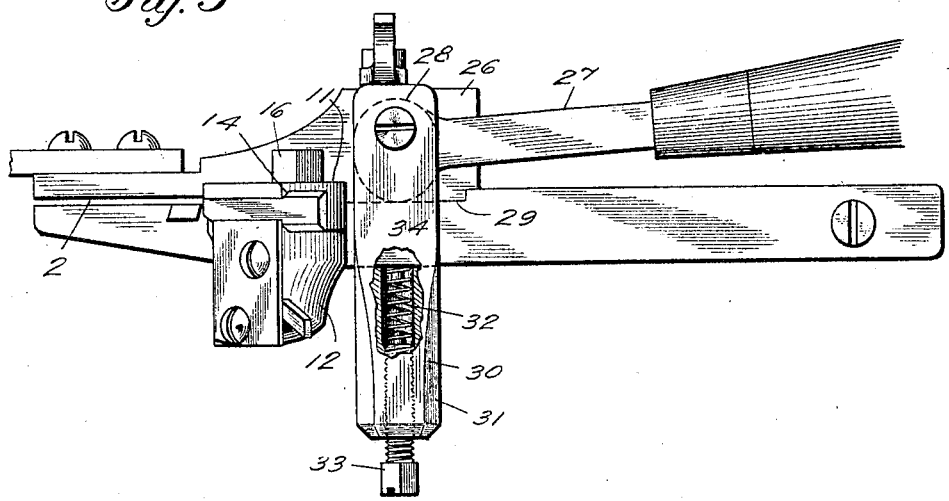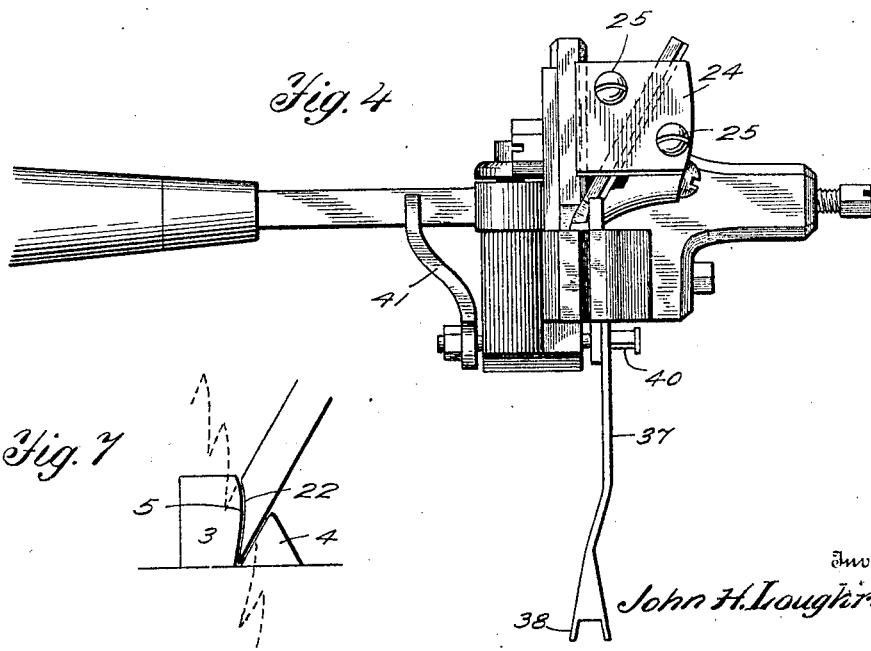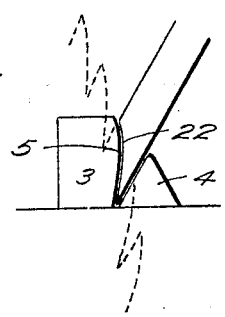

UNITED STATES PATENT OFFICE.

JOHN H. LOUGHRIDGE, OF TYLER, TEXAS.

SAW GUMMER AND SHARPENER.

No. 909,916.　　　Specification of Letters Patent.　　　Patented Jan. 19, 1909.

Application filed February 26, 1907. Serial No. 359,343.

*To all whom it may concern:*

Be it known that I, JOHN H. LOUGHRIDGE, a citizen of the United States, residing at Tyler, in the county of Smith and State of Texas, have invented new and useful Improvements in Saw Gummers and Sharpeners, of which the following is a specification.

The invention relates to an improvement in saw gummers and sharpeners, particularly designed for convenient and effective operation with gin-saws, or the like.

The main object of the present invention is the production of a saw gummer and sharpener in which the dies and coöperating bits are so constructed as to impart an oval or rounding cut to the back of the teeth, thereby materially increasing the strength of the saw teeth in use.

Another object of the invention is the provision of simple means for mounting the respective guide and cutting bits, whereby they may be adjusted with particular precision, and secured in place or removed with the minimum of inconvenience and labor.

The invention will be described in the following specification, reference being had particularly to the accompanying drawings, in which:—

Figure 1 is a perspective view illustrating the application and method of operation of my improvement, Fig. 2 is a side elevation of the same, Fig. 3 is a plan of the same, Fig. 4 is an end view of the same, Fig. 5 is a front elevation of the heads for the reception of the cutting and guiding bits, Fig. 6 is a section on line 6—6 of Fig. 5, Fig. 7 is a diagrammatic view illustrating particularly the formation of the coöperating cutting faces of the cutting die and cutting bit.

Referring particularly to the drawings, wherein are illustrated the preferred details of construction, my improved saw gummer and sharpener comprises a main stock 1, constructed of any desired material and of appropriate length and transverse sectional area. At the relatively forward end the stock is formed with a longitudinally extending centrally arranged slot 2, serving to receive the edge of the saw and to provide a guide for the saw during operation.

On the upper surface of the stock 1, to one side of the slot 2 and in advance of the rear end of said slot, I arrange front and rear dies 3 and 4. The dies are arranged in alinement longitudinally of the stock, and are spaced to provide for the passage of the cutting bits, hereinafter referred to, between them. The die 3, hereinafter termed the cutting die, is adapted for coöperation with the cutting bit, and is formed to provide a convex rear or cutting face 5, as clearly shown in Fig. 7.

A bit stock 6 is movably mounted upon the main or die stock 1, said bit stock being arranged to rest upon the upper surface of the die stock and being secured thereto through a pivot screw 7, passing through the respective stocks near their rear or handle end. The forward end of the bit stock terminates in rear of the die 4, and carries a bit head 8 for the removable reception of the cutting bit 9 and guiding bit 10. The head 8 is preferably formed of two blocks, 11 and 12, the former of which is preferably formed integral with the stock, and the latter removably secured thereto. The forward or operative faces of the respective blocks incline forwardly and downwardly toward the dies, as clearly shown in Fig. 2, the operative face of the block 11 being cut away throughout its width and length with the exception of a marginal edge or rib 13 at the relatively outer edge of the block. The rib 13 forms one securing edge for the cutting bit 9, being preferably undercut on its relatively inner surface, as at 14, to engage the bit 9, the cutaway portion of the block forming a bit receiving channel 15.

The block 12 is secured to the relatively inner side edge of the block 11 through the medium of a screw 16 and appropriately disposed dowel pins 17. As the respective blocks forming the head are of equal height, the relatively outer edge of the block 12 extends above the bit channel 15, the extended portion forming the opposing wall 18 of the bit channel, and being undercut similar to the rib 13. The block 12 is formed in its forward face with an inclined channel 19, terminating at its lower end in coincidence with the bit channel 15. The wall of the channel 19 next the bit channel 15 is preferably rounded toward said channel at its lower end, as at 20, and an adjusting screw 21 projects through the opposing wall of the channel 19 for the adjustment of the bit within said channel, as will later appear.

The cutting bit 9, preferably constructed of the usual hardened steel for cutting purposes, is coextensive in dimensions and contour with the sectional dimensions and contour of the bit channel 15 and is of a length greater than the length of the forward face of the head 8. At the relatively lower end the cutting bit 9 is formed to provide a cutting face or edge 22 concaved in longitudinal section to conform to the curvature of the face 5 of the cutting die. The rear face of the cutting bit is of plain configuration to bear against the inclined forward face of the guiding die 4.

The guiding bit 10 comprises an elongated strip of material designed to rest in the channel 19, though of materially less width than the width of said channel. The lower end of the guiding bit is formed on its forward surface with a concaved face 23, to correspond with the face of the cutting bit, the rear surface of the guiding bit coöperating with the guiding die, as shown.

As the cutting bit 9 is held between the walls 13 and 18 of the channel 15, and as wall 18 is formed on the auxiliary block 12, it is obvious that the cutting bit may be secured in longitudinally adjusted position within the channel 15 by proper manipulation of the screw 16. The guiding bit 10 is arranged in the channel 19 with its lower or operative end terminating above the lower or operative end of the cutting bit, and the inclined faces of both bits disposed in the same plane. The screw 21 is adapted to bear at its inner end against the proximate edge of the guiding bit and secure said bit in operative position within the channel 19, all as clearly shown in Fig. 5. To further secure the guiding bit in position I provide a plate 24 arranged to be secured to the block 12 by screws 25 to overlie the channel 19. The die stock is enlarged or thickened laterally in rear of the bit heads 8 to provide a bearing block 26 on which is pivotally mounted a hand operating lever 27. The forward or pivotal point of the lever is in the form of an eccentric disk 28 designed to peripherally engage a recess 29 formed in the side wall of the bit stock. A bracket member 30 is secured to the die stock opposite the block 26, being projected from said die stock in alinement with the bit stock in the form of a sleeve 31 in which is loosely mounted a coil spring 32 designed to bear against and engage the proximate face of the bit stock. An adjusting screw 33 is arranged in the end of the sleeve to provide for tensioning the spring as desired. The relatively upper surface of the sleeve 31 is projected in the form of a plate 34 to overlie the bit stock, the forward end of said plate forming an upper bearing member for the pivot pin of the lever 27. The eccentric head of the lever, together with the spring 32 provide a means for operating the bit stock in cutting the saw teeth.

As an adjunct of the cutting operation I also provide a means for automatically feeding the saw, said means comprising an L-shaped lever 35 having one arm pivotally supported in a bearing secured beneath the block 26. The remaining arm 36 of the lever projects forwardly in alinement with the die stock, and carries an arcuate feeding arm 37, bifurcated at its lower or free end, as at 38, to engage the saw teeth. The arm 37 is pivoted to the arm 36 of the lever and is also provided with a laterally projecting pin 39 designed to overlie a leaf spring 40 connected at its rear end to the lower surface of the die stock, whereby the arm is automatically actuated into and out of engagement with the saw teeth.

The pivotally supported portion of the lever 35 is projected beyond the relatively outer surface of the block 26 and is provided with a fixed arm 41, normally projecting upward into the path of movement of the handle lever 27, so that as said lever is moved to its extreme forward position, which is the inoperative position of the lever, the arm 41 will be engaged with the effect to rock the lever 35 and thereby insure a feeding movement of the arm 37.

A weighted guide shoe 42 is arranged for coöperation with the saw in advance of the cutter, being connected to the latter through the medium of an arm 43 connected at its rear end by a pivot pin 44 to the forward end of the die stock 1, said arm in rear of the pivot pin having a transversely disposed arcuate stock 45 engaging an adjusting screw 46 secured to the die stock, whereby to adjust the shoe with particular relation to the curvature of the saw being operated upon. The shoe is of a weight to overbalance the weight of the device, and is formed with an edge slot 47 to receive the saw.

The use of my improved saw gumming and sharpening device will be clearly understood from the above description taken in connection with the drawings, it being observed from Fig. 1 that after the insertion of the saw within the slot 2, the handle lever 27 is operated to force the cutting bit transverse the plane of the saw and thereby cut the material thereof.

The particular construction and arrangement of parts described provides an efficient device of this character in which the saws may be rapidly cut with a minimum of exertion. Furthermore, there is an absolute uniformity of cut, and the affected tooth will be found to be oval or rounding on back by which the teeth possess materially greater strength in operation.

The recess 29 arranged for coöperation with the eccentric head of the lever is designed primarily to receive additional plates, as small strips of steel, from time to time to take up any lost motion of the lever incident to continued operation, whereby to insure an effective cutting movement of the bit stock under each and every operation of the lever. It is, of course, to be understood that though I prefer to use the cutting die 3, as shown and described, that is with a convex rear or cutting face, that the invention herein disclosed is fully and completely effective and operative with any other specific form of cutting die, as for example a straight die, or one having any desired form of curvature. Of course, the coöperative bits will be formed to correspond with the formation of the particular die used.

While preferring the details of construction shown and described, it is obvious that various changes and modifications may be resorted to without materially affecting the operation or result of my improvement, and I wish it distinctly understood that I consider as within the spirit of the present invention, all such changes and modifications as may fall within the scope of the appended claims.

Having thus described the invention what is claimed as new, is:—

1. A saw cutter and sharpener comprising a die stock, front and rear dies carried thereby, a bit stock pivotally mounted at one end on said die stock and operable relative thereto, a bit head carried by the bit stock, a cutting bit adjustably mounted in said head adjacent to said dies and having a beveled shearing edge coöperating with the rear edge of said front die, and a guiding bit adjustably secured in said head and disposed parallel to said shearing edge and terminating above but adjustable relative to the operative end of the cutting bit and adapted to move transversely said die stock between said dies.

2. A saw cutter comprising a die stock, dies carried thereby, a bit stock, means for operating one of said stocks with relation to the other, a bit head in two parts carried by the bit stock, one of said parts being secured to the bit stock and the other part being detachable therefrom, means for clamping the said parts together, a cutting bit mounted in the first named part of the head, said parts at their meeting faces having a channel formed in the forward parts with undercut edges for said bit, a guide bit carried in said detachable part of the head, and a plate carried by said detachable part to secure said guide bit therein.

In testimony whereof, I affix my signature in presence of two witnesses.

JOHN H. LOUGHRIDGE.

Witnesses:
  GEO. S. McGHEE,
  C. B. WOOD.